United States Patent [19]

Heshmat

[11] 4,335,885
[45] Jun. 22, 1982

[54] PLURAL FLUID MAGNETIC/CENTRIFUGAL SEAL

[75] Inventor: Hooshang Heshmat, Schenectady, N.Y.

[73] Assignee: Mechanical Technology Incorporated, Latham, N.Y.

[21] Appl. No.: 179,432

[22] Filed: Aug. 19, 1980

[51] Int. Cl.³ .................. F16J 15/42; F16J 15/56
[52] U.S. Cl. ............................ 277/13; 277/80; 277/135
[58] Field of Search ............ 277/80, 15, 13, 135

[56] References Cited

U.S. PATENT DOCUMENTS

| | | | |
|---|---|---|---|
| 3,468,548 | 9/1969 | Webb | 277/13 |
| 3,968,969 | 7/1976 | Mayer et al. | 277/15 |
| 4,054,293 | 10/1977 | Hoeg | 277/80 |
| 4,200,296 | 4/1980 | Stahl et al. | 277/135 |

Primary Examiner—Robert I. Smith
Attorney, Agent, or Firm—Joseph V. Claeys

[57] ABSTRACT

A plural fluid magnetic/centrifugal-fluid seal is provided for hermetically sealing the space between a rotated shaft member and a close fitting spaced-apart stationary housing wherein the housing and the shaft are shaped to provide magnetic pole-like close clearance gap regions between their opposed surfaces. A high viscosity ferromagnetic fluid normally is disposed in the magnetic gap region with the rotating shaft member at rest and at low rotational speeds. A permanent magnet or electromagnet is provided which forms a closed magnetic circuit through the magnetic gap region with the high viscosity ferromagnetic fluid. A circumferentially arranged centrifugal seal forming region is radially disposed outward from the magnetic gap region and is located between the rotatable shaft and the stationary housing member. A low viscosity centrifugal sealing fluid is disposed in the centrifugal seal forming region and is centrifugally thrown outwardly during high speed rotation of the rotating shaft member to form a centrifugal hermetic seal between the rotating shaft member and the housing at high rotational speeds of the rotating member.

30 Claims, 10 Drawing Figures

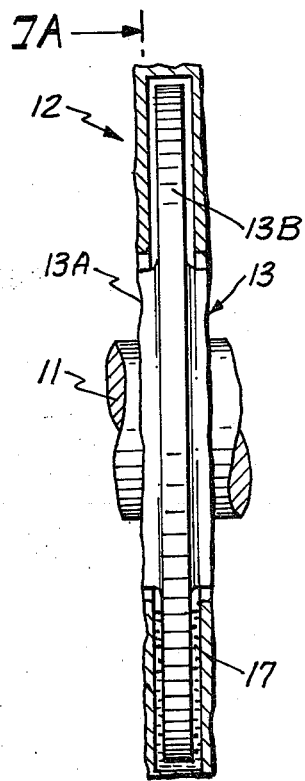
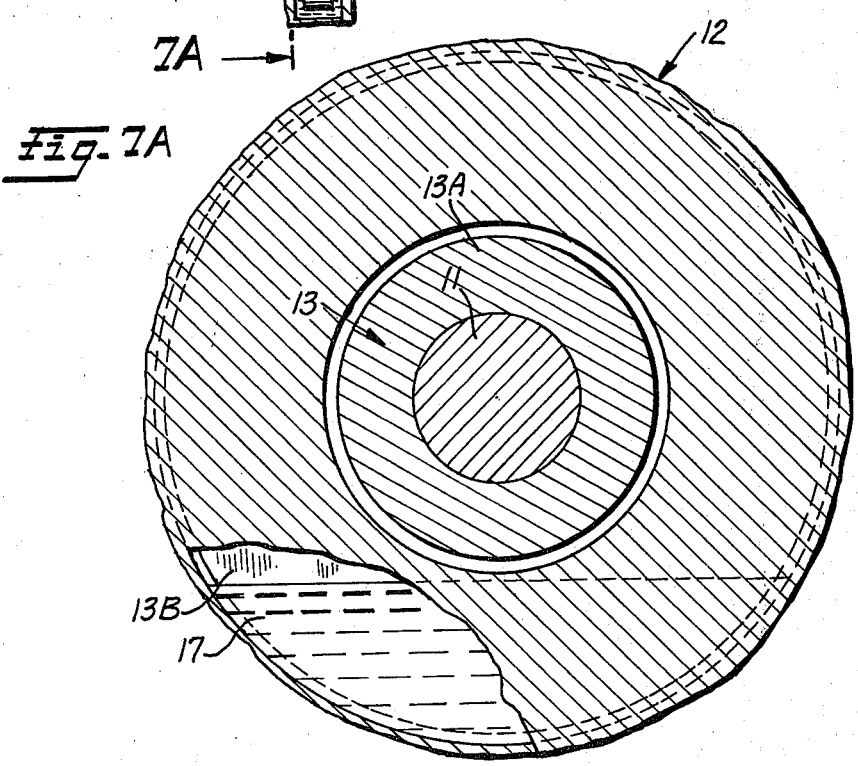

PLURAL FLUID MAGNETIC/CENTRIFUGAL SEAL

BACKGROUND OF THE INVENTION

1. Field of the Invention

This invention relates to a novel plural fluid combined magnetic/centrifugal seal.

More particularly, this invention relates to a novel combined centrifugal and magnetic seal structure which employs separate, different viscosity fluids for use during separate magnetic seal and centrifugal seal operating modes of the structure whereby each seal complements the other at different rotational speeds. The plural fluid/magnetic/centrifugal seal makes it possible for the design parameters of each seal stage, though coacting over a complete speed range, to be substantially independent one from the other and optimized design criteria can be employed in the construction of the two cooperating seals.

2. Background of Invention

A combined magnetic/centrifugal seal is described and claimed in U.S. patent application Ser. No. 140,969, filed Apr. 17, 1980 for a "Magnetic/Centrifugal-Fluid Seal" in the name of Donald F. Wilcock et al. and assigned to Mechanical Technology, Inc. The combined magnetic/centrifugal seal disclosed in U.S. patent application Ser. No. 140,969 employs a ferromagnetic fluid which in conjunction with a magnetic seal gap region of the structure, provides magnetic sealing for speed ranges from zero to rotational speeds of about 2000 revolutions per minute (rpm). At higher rotational speeds above about 2,000 rpm the same ferromagnetic fluid provides through centrifugal effects on the fluid a centrifugal sealing action for speed ranges from about 2000 rpm to 20,000 rpm. At the higher rotational speeds, however, cooling of the ferromagnetic sealing fluid is required in order that its magnetic sealing capabilities not be adversely affected by the high temperatures encountered at higher rotational speeds. It will be appreciated therefore that the upper rotational speeds at which the combined magnetic/centrifugal seals of the type described in application Ser. No. 140,969 can be driven, in effect is limited by the temperature characteristics of the ferromagnetic fluid and the ability to design into the seal structure effective cooling for the ferromagnetic fluid. To overcome these limitations, the present invention was devised.

SUMMARY OF INVENTION

It is therefore a primary object of the invention to provide a new and improved plural fluid combined magnetic/centrifugal hermetic seal which employs separte sealing fluids to effect both magnetic and centrific hermetic sealing at different rotational speed ranges.

A feature of the invention is the provision of a new and improved plural fluid, combined magnetic/centrifugal hermetic seal capable of operation over a speed range extending from zero to over 100,000 rpm.

Another feature of the invention made possible by the plural fluid combined magnetic/centrifugal seals is that it produces less heat at higher rotational speeds thereby avoiding the need for the installation of water cooling jackets and the like for those applications where the installation of such cooling capability is not feasible.

Still another feature of the invention is the provision of a seal having much lower power loss at higher rotational speeds due to the lower viscosity of the centrifugal sealing fluid.

Still another feature of the invention is the provision of a plural fluid, combined magnetic/centrifugal seal which provides a 100% hermetic seal over the entire speed range at which it is designed to operate and which is double acting, that is, the high pressure atmosphere $P_H$ acting on the seal can be on either side of the seal at any time during operation.

A further feature of the invention is the provision of a plural fluid combined magnetic/centrifugal seal which does not leak during the transition from magnetic to centrifugal sealing and vice versa due to the differences in viscosity of the high viscosity ferromagnetic sealing fluid and the low viscosity centrifugal sealing fluid. Because of the differences in viscosity, density and shearing forces, the low viscosity centrifugal sealing fluid separates and is flung centrifugally outward at lower rotational speeds than the higher viscosity ferromagnetic sealing fluid while going through the transition from low rotational speeds to high rotational speeds. Conversely, during slow down from higher rotational speeds to lower rotational speeds, the higher viscosity ferromagnetic fluid and lower shearing force acting thereon, causes it to break off and reform the magnetic seal well in advance of the break-up of the lower viscosity centrifugal sealing fluid. Thus, there is an overlap transition period during which hermetic sealing is provided by both the magnetic sealing fluid and the centrifugal sealing fluid during the critical transitional speeds.

A still further feature of the invention is the ability to optimally design the magnetic seal arrangement to withstand high pressure differentials by reason of the fact that the design of the magnetic seal stage is not restricted by volume/ratio considerations dictated by an associated centrifugal seal stage. The same observation is true of the design of the centrifugal seal stage whereby flexibility of design of both the magnetic seal and the centrifugal seal is made possible due to the fact that each operates independently of the other.

As a consequence of the advantages listed in the preceding paragraphs, the problem of leakage during transition from magnetic to centrifugal sealing and vice versa can be readily overcome in any seal configuration since each sealing stage operates independently of the other and the viscosities, densities and shearing forces acting on the respective ferromagnetic and centrifugal sealing fluids can be appropriately tailored to provide any desired overlapping sealing period during transition under conditions where the load capacity ($\Delta P_2$) is proportional to the density of the centrifugal fluid, rotor speed $\omega$, and the fluid level difference between the low pressure side, and the high pressure side.

In practicing the invention a plural fluid magnetic/centrifugal seal is provided for hermetically sealing the space between a rotating shaft member in a close fitting spaced-apart stationary housing member. The seal comprises means formed on members defining at least one magnetic pole-like close clearance magnetic seal gap region between opposed surfaces of two members. A high viscosity magnetically permeable, ferromagnetic fluid normally is disposed in the magnetic seal gap region with the rotating shaft member at rest or at low rotational speeds. Magnetic field producing means are magnetically coupled to at least portions of the rotating shaft and stationary housing members so as to include the magnetic seal gap region and the high viscosity magnetically permeable ferromagnetic fluid in a closed magnetic circuit. A circumferentially arranged centrifugal seal forming region is radially disposed outwardly from the magnetic seal gap region and is located between the rotating shaft and stationary housing members. Means are provided in communication with the centrifugal seal forming region for receiving and pooling a low viscosity centrifugal sealing fluid with the centrifugal sealing fluid being centrifugally thrown outwardly during rotation of the rotating shaft member into the centrifugal seal forming region so as to form a centrifugal hermetic seal through the medium of the fluid pooled between the rotating shaft and stationary housing member by centrifugal force at higher rotational speeds of the rotating shaft member.

In preferred embodiments of the invention, a reservoir is provided for receiving the magnetically permeable ferromagnetic sealing fluid in a space intermediate the rotating shaft member and the stationary housing member. The reservoir serves to collect and pool the ferromagnetic sealing fluid during high speed rotation of the rotating shaft member so as to isolate the two different fluids one from the other in separate but communicating spaces.

In another preferred embodiment of the invention, the low viscosity centrifugal sealing fluid is comprised by the lubricating oil of an apparatus or machine on which the plural fluid combined magnetic/centrifugal seal is installed. In such installation, the centrifugal sealing stage is included in and comprises a part of the lubricating oil cooling and supply system of the machine or other apparatus and the centrifugal seal serves as an auxiliary lubricating oil pump used in conjunction with the main lubricating oil circulating pump for pumping the lubricating oil from the centrifugal seal region to a lubricating oil reservoir comprising a part of the lubricating oil supply system for the machine, for cooling the seal system or other apparatus. In such an arrangement, the installation may further include a pressurized labyrinth buffer seal positioned on the rotating shaft member adjacent the plural fluid magnetic/centrifugal seal and a hostile high pressure atmosphere so as to form a combined two-stage labyrinth and magnetic/centrifugal seal against the high pressure hostile atmosphere.

BRIEF DESCRIPTION OF DRAWINGS

These and other objects, features and many of the attendant advantages of this invention will become better understood upon a reading of the following detailed description when considered in conjunction with the accompanying drawings, wherein similar elements in the several figures are identified by the same reference character, and wherein:

FIGS. 7 and 7A are partial schematic sketches showing the rotary vane of the seal structure in the at-rest condition;

DETAILED DESCRIPTION OF THE PREFERRED EMBODIMENTS

Figure 1:
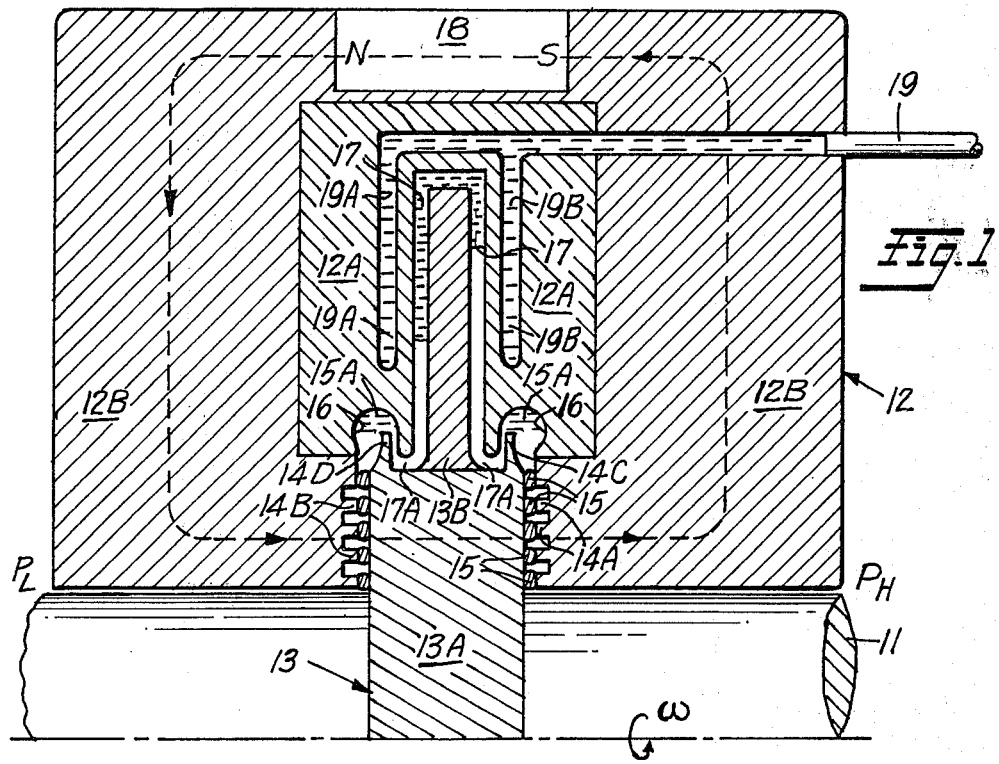
FIG. 1 is a partial sectional view of a new and improved double acting plural fluid magnetic/centrifugal hermetic seal constructed according to the present invention.

FIG. 1 is a partial sectional view of a novel plural fluid combined magnetic/centrifugal seal constructed according to the invention for sealing out a higher pressure exterior atmosphere indicated at $P_H$ from the interior of a machine or other area having a somewhat lower pressure or the same pressure $P_L$, or vice-versa. The seal shown in FIG. 1 is for a shaft indicated at 11 which is rotatably journaled in bearings (not shown) in a housing or other stationary member part of which is shown at 12. The shaft 11 includes an annular-shaped collar vane 13 keyed or otherwise secured to shaft 11 and located within a cavity or other open space formed within housing 12. The annular collar vane 13 is comprised by a larger thickness inner portion 13A having a thin vane like portion 13B secured around its outer periphery or integral therewith. The inner thick portion 13A of collar vane 13 has its flat side surface opposing a plurality of magnetic pole-like teeth shown at 14A and 14B on respective opposite sides of the thick dimension portion 13A of the collar vane. The magnetic pole-like teeth 14A and 14B are disposed opposite the opposing flat surfaces of portion 13A so as to define a plurality of close clearance magnetic gap spaces in which are disposed a plurality of droplets of a magnetically permeable ferromagnetic fluid 15. The ferromagnetic fluid 15 preferably comprises a Diester fluid in which are suspended ferromagnetic particles and may be commercially available ferromagnetic fluid sold by Ferromagnetic Fluids, Inc., and others. Preferably, the ferromagnetic fluid should be immiscible with respect to the centrifugal fluid 17 (described hereafter) and the atmospheres $P_H$ and $P_L$. The Diester base ferromagnetic fluid is preferred because of its better temperature characteristics. The ferromagnetic fluid in the magnetic gap spaces between the ends of the pole piece teeth 14A and 14B and the opposing surfaces of the collar vane portion 13A are exposed to and have access to enlarged reservoir cavities 16 having the shape of a light bulb in cross-sectional configuration but which extend around the entire periphery of the interior of the housing member 12 which surrounds the outer vane-like portion 13B of the collar vane. The purpose of the reservoirs 16 will be described more fully hereinafter with relation to the operation of the seal.

The interior portion 12A of housing member 12 is fabricated from a non-magnetic material such as copper, aluminum or alloys thereof or could even comprise a plastic material of appropriate physical strength and temperature characteristics. Besides the reservoirs 16 for the magnetic fluid 15, the interior portion 12A of the housing member includes a centrally disposed open area or casing in which the vane-like portion 13B of the annular-shaped collar vane secured to shaft 11 rides. A finite space is provided between the vane 13B and the opposing interior surfaces of the housing portion 12A so as to form a chamber in which a centrifugal sealing fluid indicated at 17 is trapped.

The centrifugal sealing fluid 17 with the shaft 11 at rest would be disposed in the lower portion of the open area or casing in which vane 13B rides as best shown in FIGS. 7 and 7A of the drawings. From this condition, as shaft 11 rotates and speeds up to higher rotational speeds, centrifugal effects will force the centrifugal fluid from the position shown at 17A out to the position at 17 if there is a ΔP across the seal, thereby effecting a centrifugal seal within the region. As readily determined from an examination of FIG. 1, the centrifugal seal region 17 is radially disposed outwardly from the magnetic seal region defined by the close clearance magnetic gap spacing between the ends of the pole pieces 14A and 14B which oppose the flat side surfaces of the larger thickness portion 13A of the collar vane.

The exterior peripheral portions 12 of the stationary housing member 12 that surround the internal non-magnetic portion 12A is fabricated from a magnetically susceptible material such as stainless steel, iron or the like. This magnetically susceptible portion 12B of housing member 12 is generally in the shape of an automobile tire which surrounds the rotatable shaft 11 and is horseshoe-shaped in cross section with the inner ends thereof being turned inwardly towards each other so as to form the pole pieces 14A and 14B opposing the flat side surfaces of the enlarged thickness portion 14A of the annular-shaped collar vane 13. A permanent magnet shown at 18 is mounted as an insert in the rim or outer peripheral surface of this magnetically permeable housing portion 12B. By this construction, a closed magnetic path is formed via the permanent magnet 18, the outer side portions 12B of the housing structure 12, the pole piece teeth 14A and 14B, the ferromagnetic fluid 15 and the enlarged thickness portion 13A of collar vane 13 which is formed from magnetically susceptible material. Vane portion 13B preferably is non-magnetic and is not included in this closed magnetic path.

As mentioned earlier, during high speed rotation of the shaft 11 (and accordingly the vane 13B of annular collar vane 13 which is secured to shaft 11) the centrifugal sealing fluid 17 is thrown outwardly by centrifugal force into the space between vane 13B and the space or casing defined by the sides of the interior non-magnetic portion 12A of the housing. While operating in this manner, frictional forces produce a substantial amount of heat and it may be necessary to provide in the interior portion 12A a cooling jacket as shown by the cooling fluid passages 19A and 19B which are supplied from a source of cooling fluid via the conduit 19.

In operation, the novel plural fluid magnetic/centrifugal seal of FIG. 1 operates in the following manner.

At standstill and at low rotational speeds up to about 2,000 rpm, the ferromagnetic fluid 15 will be retained in the close clearance magnetic gap space between the ends of the pole pieces 14B or 14A and the opposing side surfaces of the enlarged thickness collar portion 13A of collar vane 13. While retained in this position, the ferromagnetic fluid 15 forms a multiple stage magnetic seal that hermetically seals the higher pressure region $P_H$ to the right of the structure from the lower or equal pressure region $P_L$ on the left hand side of the structure. Under these operation conditions, the centrifugal fluid 17 will be in the at-rest condition as shown in FIGS. 7 and 7A.

Thereafter, as the rotational speed of the shaft 11 increases, at some point centrifugal force effects will cause the centrifugal sealing fluid to move outwardly through centrifugal force so that it surrounds the outer peripheral edge of the vane 13B as shown at 17. At this operating point, it is conceivable that both the magnetic seal 15 and the centrifugal seal 17 will be coexistent for hermetically sealing the space between the shaft 11 and housing 12 from the two different pressure atmospheres $P_H$ and $P_L$. If thereafter the rotational speed of shaft 11 is increased further up to a speed of say about 10,000 rpm, the centrifugal effects at this speed will be so great that the ferromagnetic fluid 15 will be forced by centrifugal effect up to the position 15A in the reservoir cavities 16 as the centrifugal force overcomes the magnetic force. During operation in this manner, hermetic sealing is provided primarily by the centrifugal seal formed by the fluid 17 and somewhat by a slinger seal formed by 14C and 14D. It will be appreciated therefore that by appropriate tailoring of the relative sealing capacities of the magnetic seal and the centrifugal seal, a distinct overlap can be designed into the seal thereby assuring that hermetic sealing in the space between the shaft 11 and housing 12 is always provided. If necessary during the high speed operation, cooling fluid can be supplied through the conduit 19 to the cooling jacket 19A and 19B to maintain the temperature of the seal within prescribed limits. However, inclusion of such a cooling scheme is not essential in the embodiment of the invention shown in FIG. 1 and can be done away with due to the fact that the low viscosity centrifugal sealing fluid can be comprised of water, lubricating oil, or other low viscosity fluid which does not heat up at the higher speeds of the speed range over which the seal is designed to operate.

From the above description, it will be appreciated that the invention makes it possible to optimally design both the centrifugal seal and the magnetic seal to take advantage of the strongest features of each. By employing light oils or water as the centrifugal fluid for use in high speed operation, power loss and efficiency is significantly improved and may eliminate the need for a water-jacketed cooling arrangement. As a result, the seal produces less power loss and is more efficient than previously known magnetic/centrifugal seal designs.

At standstill, the sealed pressure different ΔP is maintained by the multi-stage magnetic seal formed by the several sets of teeth of the opposed pole pieces 14A and 14B by the magnetic sealing fluid 15. The magnetic energy is supplied from the permanent magnet or electrical magnet and with the shaft at rest this pressure differential ΔP is given by the following expression:

$$\Delta P_1 = \int M(H) dH = M_s H / 4\pi 10^{-6} \text{ (atmospheres)} \qquad (1)$$

$M_s$ = Magnetization saturation of magnetic fluid (ferromagnetic fluid 15)
H = Field density in air gap (Oersteds)
$\Delta_p$ = Seal capacity/(atmospheres) per stage
$\mu_o$ = Permeability of air equal to $(4\pi \times 10^{-7} W/(At-m))$
At—ampere turns
M—meter
W—Webers As the shaft 11 starts to rotate, the centrifugal sealing fluid 17 maintained between the vane 13B and housing portion 12A generates a centrifugal pressure which is augmented by the magnetic fluid seal as defined above. The sum of the differential pressure carried by the plural fluid combined magnetic/centrifugal seal at this point is given by the expression: $\Sigma \Delta P = \Delta P_1 + \Delta P_2$ where:

$$\Delta P_2 = (\rho \omega^2/8)(r_o^2 - r_i^2) \qquad (2)$$

Figure 2:
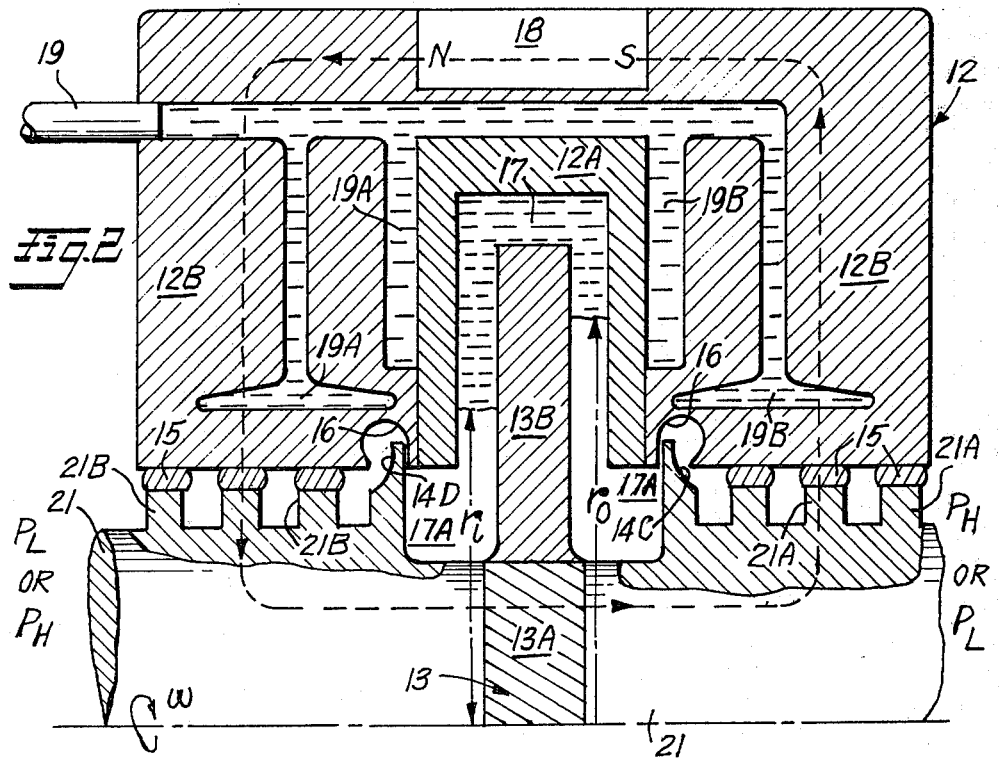
FIG. 2 is a partial sectional view of a second form of the invention different from that of FIG. 1 in that it employs an axially arrayed magnetic seal and includes a cooling jacket for maintaining the temperature of both the magnetic sealing fluid and the centrifugal sealing fluid within prescribed limits.

$r_o$ is the fluid level on the high pressure side as indicated in FIG. 2;
$r_i$ is the fluid level on the low pressure side as indicated in FIG. 2;
$\rho$ is the density of the fluid (17);
$\omega$ is the shaft speed (11) rad/sec (angular speed)
$\Delta P_1$ is the pressure differential across the magnetic seal; and
$\Delta P_2$ is the pressure differential across the centrifugal seal.

Figure 8:
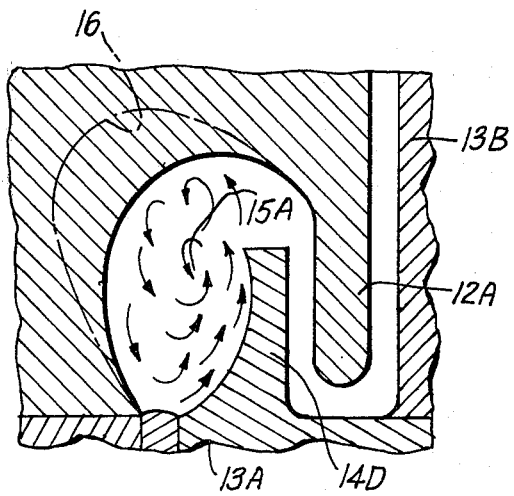
FIG. 8 is a partial, exploded sectional view of the ferromagnetic fluid reservoir showing the details of the shoulder design of the vane whereby slinger action is achieved.

At high speed the magnetic sealing fluid 15 is eventually ejected from between the magnetic pole piece teeth 14A and 14B by centrifugal force and eventually will be trapped in the magnetic fluid reservoirs 16 as shown at 15A, where it rotates due to the slinger action provided by the slinger shoulders 14C and 14D as best shown in FIG. 8. The slinger design at the shoulders of the collar vane portion 13A prevents the magnetic sealing fluid 15 from moving into the centrifugal seal region and hence keeps the two fluids from mixing. The geometrical configuration of the magnetic fluid reservoirs 16 also assists in preventing mixing of the two sealing fluids by preventing the magnetic seal fluid 15 from becoming mixed with the rotating mass of centrifugal sealing fluid 17 at the outer rim of vane portion 13B of the collar vane. Consequently, the magnetic sealing fluid 15 at high speed will be retained in the reservoir 16 as shown at 15A because of the slinger action as described earlier. At the higher speeds, the differential pressure carried by the plural fluid combined magnetic/centrifugal seal will be provided primarily by the centrifugal sealing region and is given by the expression:

$$\Delta P_2 = (\rho_2 \omega^2/8)(r_o^2 - r_i^2) \qquad (3)$$

In addition, any slinger sealing capacity $\Delta P_3$ provided by the slinger action described above is added to that of the centrifugal seal.

As the rotational speed of shaft 11 decreases, the magnetic-gravitational forces again will dominate the centrifugal forces acting on the magnetic sealing fluid 15 so that the magnetic sealing fluid 15 flows from the reservoir 16 back in between the magnetic teeth 14B (or 14A). Upon this occasion, the pressure difference again will be carried by both the magnetic seal region and the centrifugal seal region as explained with relation to equation (2). Thereafter as the rotational speed of shaft 11 decreases further to approach zero and at standstill, the pressure difference then will be transferred to the multiple magnetic stages alone and the pressure differential will be carried only by the magnetic seal region as set forth in equation (1).

Figure 5:
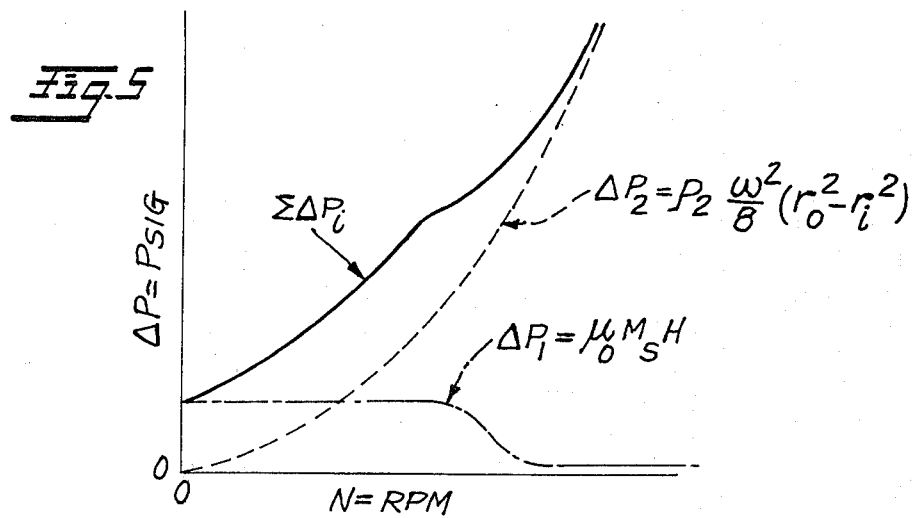
FIG. 5 is an operating characteristic curve for a novel plural fluid combined magnetic/centrifugal seal according to the invention, showing the speed versus differential pressure sealing capability of the structure wherein the speed of a shaft being sealed is plotted as the abscissa and the differential pressure sealing capability in pounds per square inch is plotted as the ordinate.

FIG. 5 is a characteristic curve showing rotational speed N of shaft 11 in revolutions per minute plotted against the differential pressure $\Delta P$ in pounds per square inch for the plural fluid combined magnetic/centrifugal fluid seal of the type shown in the drawings. In this plot, the rotational speed of the shaft is plotted as the abscissa and the differential pressure which the seal can withstand is plotted as the ordinate. From FIG. 5 it will be seen that the differential pressure withstood by the multiple stage magnetic seal $\Delta P_i$ remains substantially constant as might be expected since the terms of equation (1) are not effected by the speed of shaft 11. It will be noted, however, that at the transition point $\Delta P_1$ drops speed from its constant value to some non-zero but very small value at the operating speed where the magnetic fluid 15 is thrown from the magnetic sealing region up into reservoir 16. In contrast to the magnetic seal, the centrifugal seal provides essentially zero sealing at standstill and low rotational speeds and increases exponentially with increases in speed in accordance with equation (3).

FIG. 2 of the drawings illustrates a modified form of plural fluid combined magnetic/centrifugal fluid seal according to the invention wherein the plurality of magnetic sealing stages are axially arrayed in concentric rings along the rotating shaft 21. In contrast to the FIG. 1 structure, shaft 21 is formed from magnetically permeable materials such as stainless steel, iron, etc., and has a plurality of concentric ring-like pole piece teeth 21A and 21B formed thereon on each side of a collar vane 13 comprised by a magnetically susceptible enlarged diameter portion 13 integral with or otherwise secured to shaft 21 and an outer vane portion 13B preferably formed of non-magnetic material. The concentric rings of magnetic pole teeth 21A and 21B oppose the end surfaces of the outer stationary housing portion 12B which is horseshoe-shaped in cross-sectional configuration and is fabricated from magnetically permeable material such as stainless steel, iron and the like. The ends of the stationary housing portion 12B are spaced apart a short distance from the circumferential ends of the pole piece teeth 21A and 21B formed on shaft 21 so as to define close clearance, magnetic gap spaces in which a ferromagnetic fluid 15 is disposed with the shaft 21 at standstill or at low rotating speeds. The magnetically permeable stationary portion 12B surrounds an inner stationary portion 12A formed from non-magnetic material which surrounds and is spaced apart a small distance from the rim or circumferential end as well as the sides of the vane portion 13B of the collar vane 13. Disposed in this space is a low viscosity centrifugal sealing fluid 17 which may comprise water, a light hydrocarbon oil, a vegetable oil or the like which is not immiscible in the ferromagnetic sealing fluid 15 or vice versa or in the atmosphere being sealed out by the sealing structure. If desired, a suitable cooling jacket which is connected with a cooling fluid shown at 19A via conduit 19 to a source of cooling fluid may be formed in the housing portion 12 for providing cooling to the structure. However, the inclusion of such a cooling jacket is not necessary for applications where the centrifugal sealing fluid may comprise water or some other light oil having low frictional losses at high rotational speeds of vane 13B. Reservoirs 16 are provided on each side of housing portion 12B which coacts with slinger surfaces 14C and 14D in the same manner as described with relation to FIG. 8.

In operation, the seal structure of FIG. 2 functions in substantially the same manner as described with relation to the structure of FIG. 1. Both the FIG. 2 and FIG. 1 embodiments of the invention are symmetrical in design in that both designs have equal numbers of ferromagnetic sealing stages on both sides of the centrifugal vane 13B. For this reason it does not matter to which side of the seal the high pressure atmosphere $P_H$ is applied. For installations where it is known to which side of the seal the high pressure is to be applied, it may be possible to reduce the number of ferromagnetic sealing stages on the opposite side in much the same manner as shown in FIG. 4 of the drawings and as will be described more fully hereinafter in connection with FIG. 4.

Figure 3:
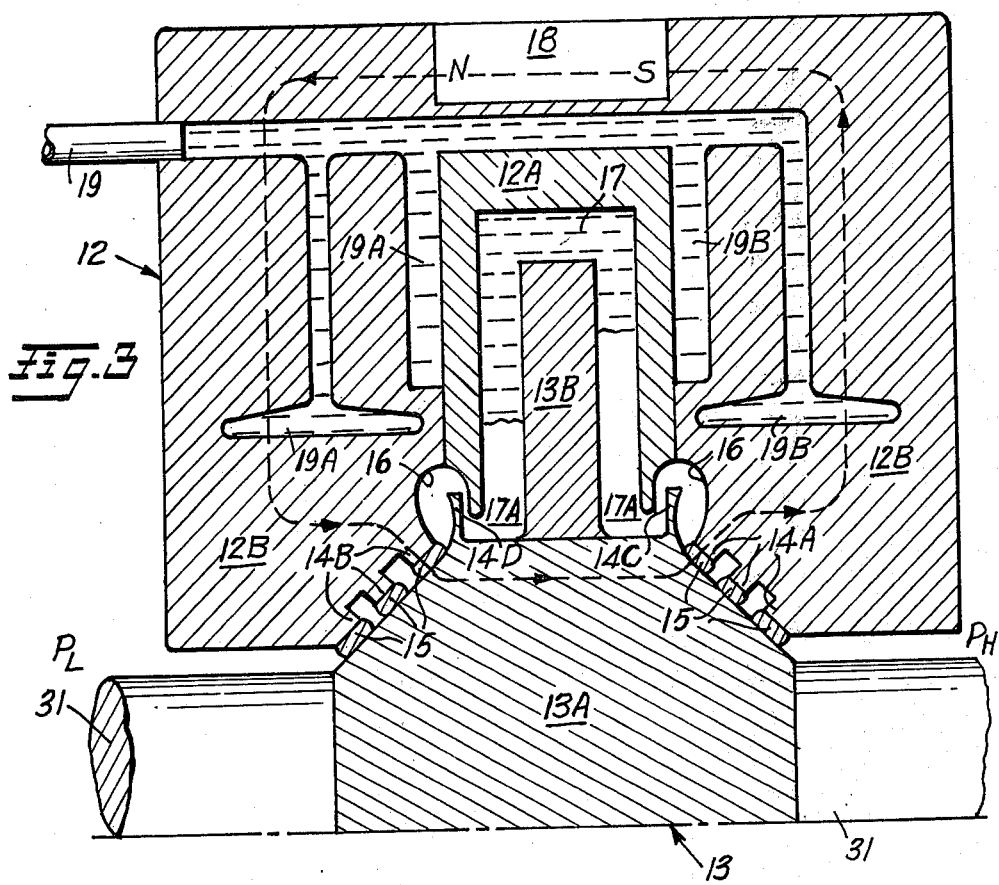
FIG. 3 is a partial schematic view of still a third embodiment of the invention somewhat similar to that of FIG. 2 wherein the magnetic seal region is formed on a tapered portion of the shaft.
Figure 6:
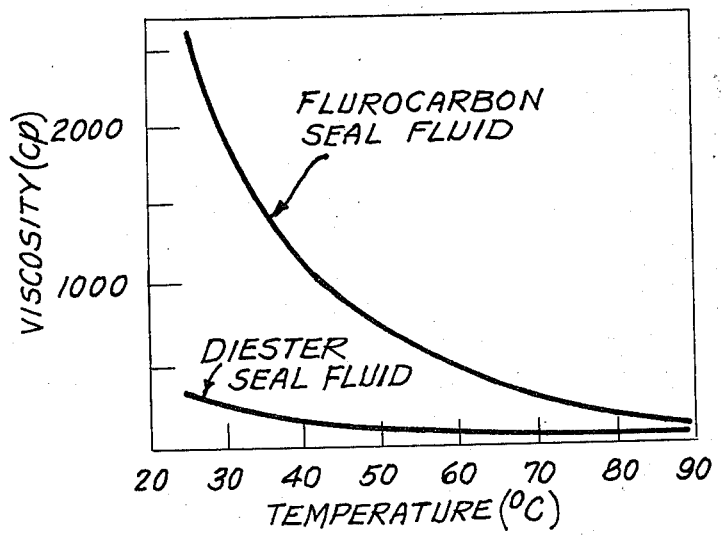
FIG. 6 is a plot of the change in viscosity versus temperature of two different ferromagnetic sealing fluids wherein the temperature is plotted as the abscissa and the changes in viscosity are plotted as the ordinate.

FIG. 3 of the drawings illustrates a modified form of the plural fluid, combined magnetic/centrifugal seal shown in FIG. 2 wherein a tapered centrifugal vane region is provided on shaft 11. The plural fluid, combined magnetic/centrifugal sealing structure of FIG. 3 differs from the structure of FIG. 2 in that a plurality of magnetic sealing stages are formed by magnetic pole piece teeth 14A and 14B which oppose tapered side surfaces of an increased thickness, tapered magnetically permeable portion 13A of the collar vane 13. Opposite tapered collar portion 13A, the magnetic pole piece teeth 14A and 14B are formed in complementary, diagonally tapered end surfaces on the exterior stationary housing portions 12B. The stationary housing portions 12B including pole piece teeth 14A and 14B are fabricated from magnetically permeable material such as stainless steel, iron, etc., and are included in a series magnetic circuit with permanent magnet 18. With the shaft 31, which may be of a non-magnetic material, at standstill or at low rotational speeds, the ferromagnetic sealing fluid 15 will be dispersed in the close clearance gap spaces between the ends of the pole piece teeth 14A and 14B and the tapered side surfaces of the magnetically permeable vane portion 13A. As a consequence, a closed magnetic circuit will be formed which includes the vane portion 13A, the ferromagnetic sealing fluid 15, the pole pieces 14A and 14B, the magnetically susceptible portions 12B of housing member 12 and permanent magnet 18. The vane portion 13B of collar vane 13 preferably is fabricated from non-magnetic material and is disposed in a centrifugal sealing region defined by the inner non-magnetic portion 12A of stationary housing member 12.

In operation, the embodiment of the invention shown in FIG. 3 functions in a manner that is similar to the FIG. 1 embodiment of the invention and includes the isolating reservoirs 16 for assuring isolation between the ferromagnetic sealing fluid 15 and the centrifugal sealing fluid 17. An advantage of the embodiment of the invention shown in FIG. 3 over FIG. 1 is that it provides longer transition time. The ferromagnetic sealing fluid 15 in this design (FIG. 3) takes greater centrifugal force in order to transfer magnetic fluid 15 into the reservoir 16 because of tapered path of magnetic stages (14B or 14A). Because the projected component of centrifugal force acts on the fluids only, in order to transfer fluid 15 into reservoir 17 at a certain speed, the freedom of design for controlling transition time of fluid 15 is greater in this configuration.

Figure 4:
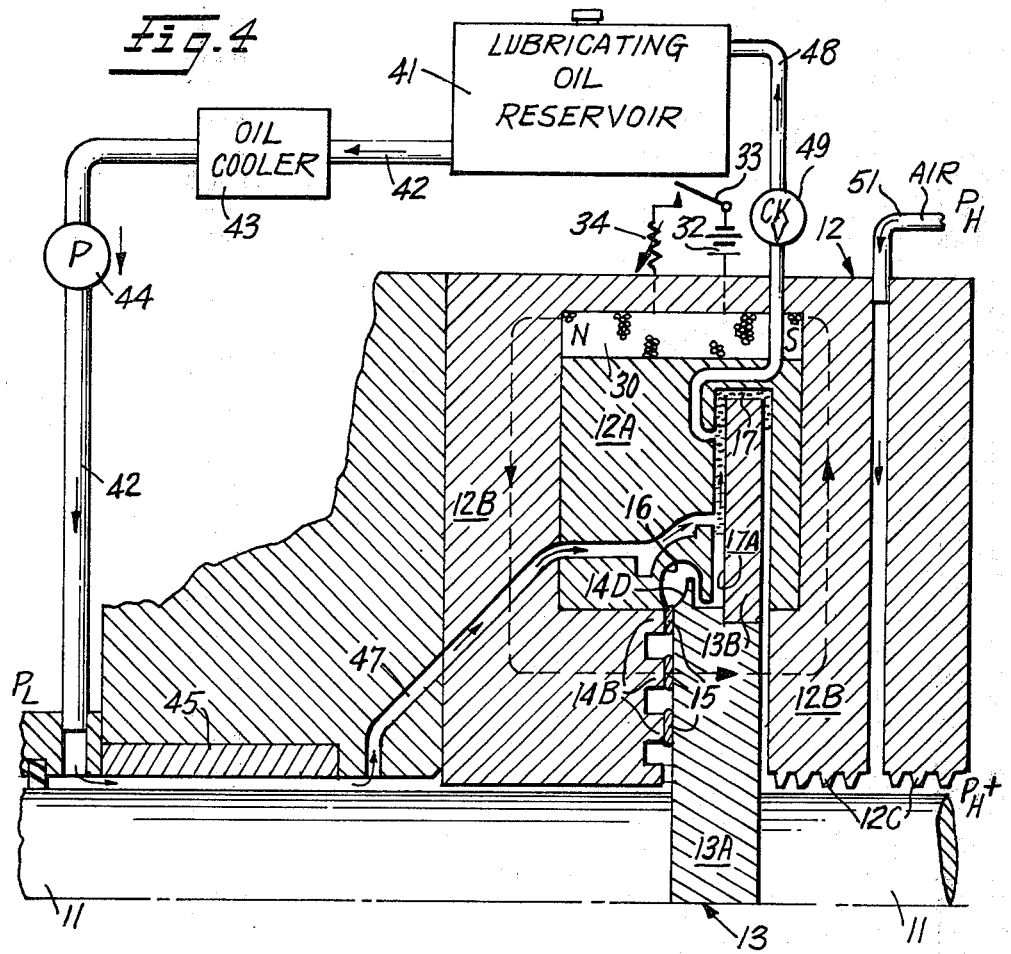
FIG. 4 is a partial sectional view of still a different form of the invention wherein the lubricating oil of a machine or other apparatus is used as the centrifugal sealing fluid, and illustrates how pumping action for the lubricating oil is obtained with the vane.

FIG. 4 of the drawings illustrates still another embodiment of the invention wherein the lubricating oil of a machine or other apparatus with which the novel plural fluid, combined magnetic/centrifugal fluid seal is installed is used as the centrifugal sealing fluid. In FIG. 4 shaft 11 which may be fabricated from a non-magnetic material has secured thereto an annular collar vane 13 having an increased thickness inner annular portion 13A and an outer vane portion 13B. The inner annular increased thickness portion 13A is fabricated from a magnetically permeable material such as stainless steel, iron or the like and rotates in a space defined by the spaced apart ends of a generally inverted U-shaped cross-sectional stationary housing portion 12B of stationary housing 12. Similar to the FIG. 1 seal configuration, the ends of at least one of the legs of the inverted U-shaped housing portion 12B, which is fabricated from magnetically permeable material, have tooth-shaped magnetic pole pieces 14B formed therein. If it is not known which side of the seal must sustain the high pressure atmosphere $P_H$, or if during operation $P_H$ switches from one side of the seal to the other, corresponding magnetic pole piece teeth such as 14A in the FIG. 1 arrangement can be formed in the remaining end of housing portion 12B depending upon the particular application for which the seal is designed. The purpose of having magnetic pole piece teeth on both sides of the runner or stationary part is to seal a system where the high pressure side is not known, or the seal has to operate under conditions where the high pressure side, relative to the speed of the rotor 11 such as in FIG. 1, is switching from one side to another. As mentioned earlier, this is one of the advantages of the double-acting seal. Conventionally, seals operate unidirectionally. For example, most face seals, mechanical seals, pumping seals or tight clearance convergent seals operate unidirectionally. Therefore, it is not necessary to have the magnetic seal portion of this invention on both sides of the runner in all configurations unless it is required. With reference to FIG. 1 and the condition which is shown, (i.e., $P_H$ at right hand side and $P_L$ at left hand side of the seal), if this arrangement of high and low pressure sides is true, throughout the system operation, then the right hand side of the magnetic sealing arrangement (14A, 15, 17A, 15A, 16) does not function and should be omitted from the design. While the $P_H$ on only one side, after the first start up, magnetic fluid 15A cannot be returned to 15 unless some positive pressure acts on the fluid 15A. Thus, sealing capacity is based on one side and only one side of the magnetic sealing arrangement. In those seal configurations herein disclosed, the parts have been shown symmetrically for the sake of broad applications where it is not known that $P_H$ will act from one side only.

A ferromagnetic sealing fluid 15 is disposed in the close clearance magnetic seal gap region disposed between the ends of the pole piece teeth 14B and opposing side surfaces of collar vane portion 13A. An electromagnet shown at 30 is centrally positioned with respect to the housing portions 12B so as to provide a magnetic field indicated by the dotted line arrow which threads a closed circuit magnetic path formed by the housing portions 12B, the pole pieces 14B, the ferromagnetic fluid 15 and the collar vane portion 13A. The electromagnet 30 is supplied from a suitable source of excitation current which may comprise a battery 32 through an on/off control switch 33 and a current controlling variable resistor 34 for controlling the strength of the magnetic field produced by coil 30.

The outer vane portion 13B of annular collar vane 13 rotates within a centrifugal sealing space or region defined by an interior housing portion 12A formed on non-magnetic material so that during high speed rotation of vane portion 13B, a centrifugal seal is formed by fluid 17 between the confronting surfaces of the interior housing portion 12A and the rim and outer peripheral portion of vane 13B. Similar to the seal structure of FIG. 1, the ferromagnetic sealing fluid reservoir 16 is formed in the interior stationary housing portion 12A at the lower end thereof which communicates with the close clearance magnetic sealing gap spaces of the multiple stage magnetic seal comprised by pole pieces 14B. By this construction, during high speed rotation of shaft 11, the high viscosity, ferromagnetic sealing fluid 15 is pooled in the reservoir 16 by slinger action as described with relation to FIG. 8; and is thereby isolated and prevented from intermixing with the centrifugal sealing fluid 17.

The centrifugal sealing fluid 17 is supplied to the centrifugal sealing region from a lubricating oil reservoir shown at 41 via an oil supply line 42, lubricating oil cooler 43 and lubricating oil pump 44. This lubricating oil supply system constitutes the normal lubricating oil supply and cooling system used for the bearings and seals of many different kinds of machines and apparatus wherein the lubricating oil is supplied via conduit 42 to the bearing shown generally at 45. This oil is leaked off around shaft 11 to a lubricating oil supply conduit 47 formed in the stationary housing structure 12 that leads to the centrifugal sealing region in the close clearance spaces between the rim and outer peripheral portions of vane 13B. From the centrifugal seal region, the lubricating oil then is bled off through a discharge conduit 48 and check valve 49, back to the inlet side of the lubricating oil reservoir 44. It should be noted at this point, that this may not be the only return conduit providing for the flow of lubricating oil reservoir 41. The parameters of the supply conduit 47 and discharge conduit 48 are tailored to supply and discharge lubricating oil for use as the centrifugal sealing fluid for the entire peripheral extent of the centrifugal sealing region surrounding the rim and outer peripheral portion of vane 13B. Accordingly, these parameters must be dimensioned to assure sufficient flow to keep the centrifugal sealing oil cooled within its specifications. While operating in this mode at the high rotational speeds, the vane 13B serves not only to create and maintain the centrifugal seal but also functions as a pump for pumping heated lubricated oil through the outlet conduit 48 and check valve 40 back to the intake of the lubricating oil reservoir 41. FIG. 4A of the drawings best illustrates the parameters whereby pumping action is obtained from vane 13B.

In addition to the above features, the sealing structure of FIG. 4 may further include a buffer labyrinth seal shown at 12C on the outer exterior end of stationary housing member 12 which rotationally supports shaft 11. A suitable conduit shown at 51 is formed in the housing portion 12B to supply pressurized air or other gaseous fluid for discharge into the space between the labyrinth seal rings 12C and shaft 11 as indicated by the solid line arrows. This pressurized air not only will serve to prevent fluid from a hostile atmosphere which may be at a very high pressure as indicated at $P_H^+$ from entering into the sealing structure but also tends to pressurize the side of vane portion 13A and vane 13B where no magnetic seal stages are formed. This then prevents loss of lubricating oil from the centrifugal sealing region in addition to preventing seepage of the very high hostile atmosphere indicated at $P_H^+$.

From the foregoing description it will be appreciated that the plural fluid combined magnetic/centrifugal seal of this invention makes available to a designer of seal structures the following important advantageous features. It provides a stable and high differential pressure $\Delta P$ across the seal at both high and low rotational speeds as well as at standstill and produces a 100% hermetic seal under all conditions of operation. The high differential pressure $\Delta P$ provided at 0 rotation and at low rotational speeds by the magnetic seal stages are not governed by volume ratio considerations dictated by a coacting centrifugal seal region and therefore optimized magnetic seal configurations can be devised. There is a much less power loss due to the low viscosity of the centrifugal sealing fluid. Because of the independence of the centrifugal seal configuration from the magnetic seal stages, it too is susceptible to flexible design criteria. The 100% hermetic sealing provided by the structure can be obtained at relatively low cost since tight clearance or spacing, precise machining of components, etc. is not required. Finally, there is no problem of leakage during transition from magnetic fluid sealing to centrifugal fluid sealing and vice versa because of the difference in viscosity, density and slinger characteristics of the two fluids. The low viscosity centrifugal sealing fluid is sheared and centrifugally forced into the centrifugally sealing region at angular speeds well below the shearing force required to separate the magnetic sealing fluid from the magnetic sealing region because of the difference $\Delta R$ in radii and density, etc. The reverse process is true during slow down so that at all times 100% hermetic sealing is assured.

Figure 9:
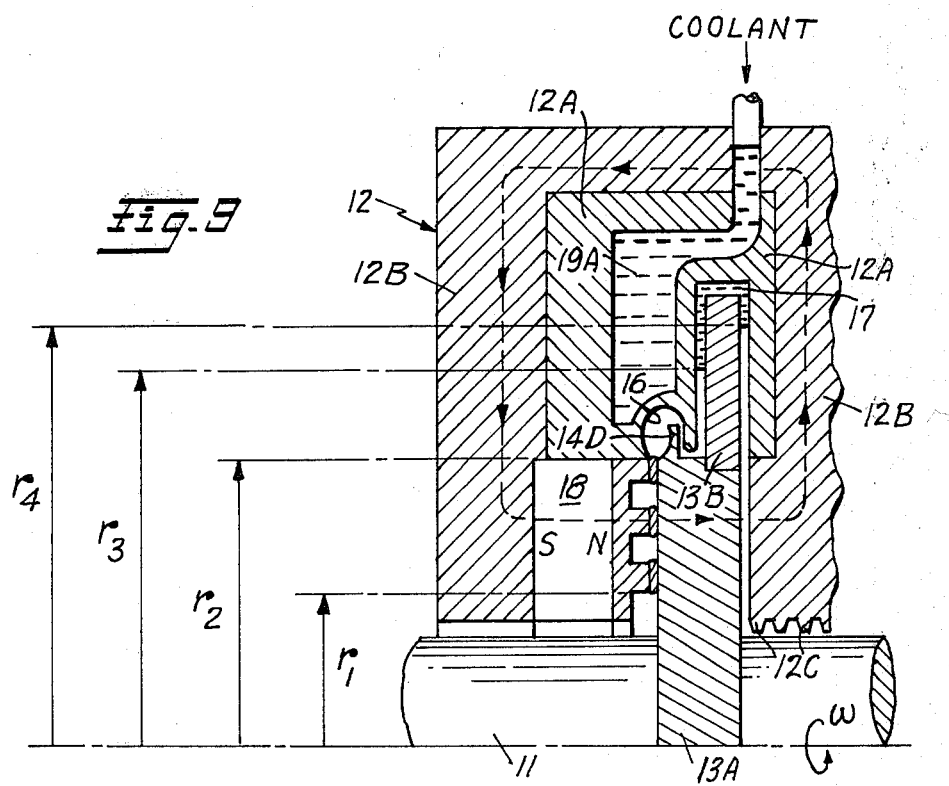
FIG. 9 is a partial schematic view of the FIG. 8 structure and illustrates certain critical dimensions.

With reference to FIG. 9, it will be seen that the average radius $R_A$ for the centrifugal sealing region is given by the expression $$R_A = (r_3 + r_4)/2$$

and the average radius $R_B$ for the magnetic seal region is given by $$R_B = (r_1 + r_2)/2.$$

It is clear from FIG. 9 that $R_A$ is greater than $R_B$ ($R_A > R_B$) and that the difference $\Delta R = R_A - R_B$. Since the centrifugal force in each region is proportional to the average tip speed and the average tip speed for the respective sealing region is given by $\omega R_A$ and $\omega R_B$ where $\omega$ is the angular speed of the shaft, it follows that at any transitional shaft speed $\omega$, the centrifugal force developed in the centrifugal seal region will exceed the centrifugal force developed in the magnetic seal region.

Having described several embodiments of a new and improved plural fluid combined magnetic/centrifugal fluid seal constructed according to the invention, other changes, variations and modifications of the various embodiments of the invention disclosed will become apparent to those skilled in the art in the light of the above teachings. It is therefore to be understood that any such modifications, variations and changes are believed to come within the scope of the invention as defined by the appended claims.

What is claimed is:

1. A plural fluid magnetic/centrifugal-fluid seal for hermetically sealing the space between a rotating member and a close fitting spaced-apart stationary member comprising means formed on said members defining at least one magnetic pole-like close clearance magnetic seal gap region between opposed surfaces of the members, a high viscosity magnetically permeable ferromagnetic fluid normally disposed in said magnetic gap region with said rotating member at rest or low rotational speeds, magnetic field producing means magnetically coupled to at least portions of said rotating and stationary members, said magnetic seal gap region and said high viscosity magnetically permeable ferromagnetic fluid in a closed magnetic circuit, a circumferentially arranged centrifugal seal forming region radially disposed outwardly from said magnetic seal gap region and located between the rotating and stationary members, means in communication with said centrifugal seal forming region for receiving and pooling a low viscosity centrifugal sealing fluid, said centrifugal sealing fluid being centrifugally thrown outwardly during high speed rotation of said rotating member into said centrifugal seal forming region to thereby form a centrifugal hermetic seal through the medium of the fluid pooled between the two members by centrifugal force at high rotational speeds of said rotating member.

2. A plural fluid magnetic/centrifugal-fluid seal according to claim 1 further comprising a plurality of magnetic pole-like teeth forming a plurality of close clearance magnetic gap regions between the opposed surfaces of the rotating and stationary members which coact to form a multiple stage magnetic seal while said rotating member is at rest and during slow speed rotation thereof.

3. A plural fluid magnetic/centrifugal-fluid seal according to claim 1 wherein the high viscosity magnetically permeable fluid comprises a ferrofluid formed by a ferric suspension in a suitable carrier liquid having low viscosity and strong saturation magnetization characteristics and wherein both the magnetically permeable fluid and the low viscosity centrifugal fluid are immiscible with respect to each other and to other fluids being sealed.

4. A plural fluid magnetic/centrifugal-fluid seal according to claim 1 wherein the magnetic field producing means comprises a permanent magnet capable of producing a sufficiently strong magnetic field to drive the magnetic permeable fluid into a saturation magnetization condition.

5. A plural fluid magnetic/centrifugal-fluid seal according to claim 1 wherein said magnetic field producing means comprises an electromagnet capable of producing a sufficiently strong magnetic field to drive the magnetically permeable fluid into a saturation magnetization condition and electrically controlled by on/off switch means for turning the electromagnet on while the rotatable member is at rest and during slow speed operation thereof and for turning the electromagnet off during high speed rotation of the rotatable member.

6. A plural fluid magnetic/centrifugal-fluid seal according to claim 1 further including means for cooling the circumferentially arranged centrifugal seal forming region of said seal during high speed rotation of said rotatable member.

7. A plural fluid magnetic/centrifugal-fluid seal according to claim 1 further including a reservoir for said magnetically permeable fluid formed in a space intermediate the rotating and stationary members for collecting and pooling said magnetically permeable fluid during high speed rotation of said rotating member to thereby essentially isolate the two different viscosity fluids one from the other in separate but communicating spaces.

8. A plural fluid magnetic/centrifugal-fluid seal according to claim 7 further comprising a plurality of magnetic pole-like teeth forming a plurality of close clearance magnetic gap regions between the opposed surfaces of the rotating and stationary members which coact to form a multiple stage magnetic seal while said rotating member is at rest and during slow speed rotation thereof.

9. A plural fluid magnetic/centrifugal-fluid seal according to claim 8 wherein said rotating member comprises a rotatable shaft having a circular cross section and journaled in a housing which comprises a part of said stationary member and wherein said rotatable shaft includes a magnetically permeable annular collar vane secured thereto and rotatable therewith and said housing in conjunction with the stationary member defines an annular cavity surrounding the collar vane to thereby form the circumferentially arranged centrifugal seal forming region in the space between the end of the cavity and the circumferential edge of the annular collar vane and the plurality of magnetic seal stages being formed by concentrically arranged teeth formed in the inner surfaces of said stationary member and that oppose the flat surface portions of said annular collar vane extending between the circumferential edge portion thereof and the point of jointure of the collar vane to the rotatable shaft.

10. A plural fluid magnetic/centrifugal-fluid seal according to claim 9 wherein the high viscosity magnetically permeable fluid comprises a ferrofluid formed by a ferric suspension in a suitable carrier liquid having high viscosity and strong saturation magnetization characteristics and wherein both the magnetically permeable fluid and the low viscosity centrifugal fluid are immiscible with respect to each other and to other fluids being sealed.

11. A plural fluid magnetic/centrifugal-fluid seal according to claim 10 wherein the magnetic field producing means comprises a permanent magnet capable of producing a sufficiently strong magnetic field to drive the magnetic permeable fluid into a saturation magnetization condition.

12. A plural fluid magnetic/centrifugal-fluid seal according to claim 10 wherein said magnetic field producing means comprises an electromagnet capable of producing a sufficiently strong magnetic field to drive the magnetically permeable fluid into a saturation magnetization condition and electrically controlled by on/off switch means for turning the electromagnet on while the rotatable member is at rest and during slow speed operation thereof and for turning the electromagnet off during high speed rotation of the rotatable member.

13. A plural fluid magnetic/centrifugal seal according to claim 1 wherein the low viscosity centrifugal sealing fluid comprises the lubricating oil of an apparatus or machine on which the seal is used with the means for receiving and pooling the low viscosity centrifugal sealing fluid being included in and comprising a part of the lubricating oil cooling and supply system for the machine and wherein said centrifugal seal serves as an auxiliary lubricating oil pump used in conjunction with the main lubricating oil circulating pump for pumping the lubricating oil from said centrifugal seal region to a lubricating oil reservoir comprising a part of the lubricating oil supply system.

14. A plural fluid magnetic/centrifugal seal according to claim 13 further including a pressurized labyrinth buffer seal positioned on the rotating member adjacent the plural fluid magnetic/centrifugal seal intermediate the plural fluid magnetic/centrifugal seal and a hostile high pressure atmosphere and coacting with the plural fluid magnetic/centrifugal seal to form a combined two-stage labyrinth and magnetic/centrifugal seal against the high pressure hostile atmosphere.

15. A plural fluid magnetic/centrifugal seal according to claim 10 wherein the low viscosity centrifugal sealing fluid comprises the lubricating oil of an apparatus or machine on which the seal is used with the means for receiving and pooling the low viscosity centrifugal sealing fluid being included in and comprising a part of the lubricating oil cooling and supply system for the machine and wherein said centrifugal seal serves as an auxiliary lubricating oil pump used in conjunction with the main lubricating oil circulating pump for pumping the lubricating oil from said centrifugal seal region to a lubricating oil reservoir comprising a part of the lubricating oil supply system.

16. A plural fluid magnetic/centrifugal seal according to claim 15 further including a pressurized labyrinth buffer seal positioned on the rotating member adjacent the plural fluid magnetic/centrifugal seal intermediate the plural fluid magnetic/centrifugal seal and a hostile high pressure atmosphere and coacting with the plural fluid magnetic/centrifugal seal to form a combined two-stage labyrinth and magnetic/centrifugal seal against the high pressure hostile atmosphere.

17. A plural fluid magnetic/centrifugal fluid seal according to claim 2 wherein said rotating member comprises a rotatable shaft having a circular cross section and journaled in a housing which comprises a part of said stationary member and wherein said rotatable shaft includes a magnetically permeable annular collar vane secured thereto and rotatable with the shaft and said housing in conjunction with the stationary member defines an annular cavity surrounding the collar vane to thereby form a circumferentially arranged centrifugal seal forming region in the space between the end of the cavity and the circumferential edge of the annular collar vane, the plurality of magnetic seal stages being formed by a plurality of concentrically arranged rows of pole piece teeth disposed on each side of the collar vane in the space between the shaft and the housing with the magnetically permeable fluid being disposed in the space between the ends of the teeth and the opposing surfaces of the opposite member during the magnetic seal operating mode to thereby form plural stage magnetic seals on each side of the collar vane.

18. A plural fluid magnetic/centrifugal seal according to claim 17 wherein the portions of the shaft on each side of the annular collar vane on which the magnetic seal stages are formed are tapered from a larger diameter portion immediately adjacent the annular collar vane to a smaller diameter portion at the end of the magnetic seal stage regions away from the annular collar vane.

19. A plural fluid magnetic/centrifugal-fluid seal according to claim 18 further including a reservoir for said magnetically permeable fluid formed in a space intermediate the rotating and stationary members for collecting and pooling said magnetically permeable fluid during high speed rotation of said rotating member to thereby essentially isolate the two different viscosity fluids one from the other in separate but communicating spaces.

20. A plural fluid magnetic/centrifugal-fluid seal according to claim 19 wherein the high viscosity magnetically permeable fluid comprises a ferrofluid formed by a ferric suspension in a suitable carrier liquid having low viscosity and strong saturation magnetization characteristics and wherein both the magnetically permeable fluid and the low viscosity centrifugal fluid are immiscible with respect to each other and to other fluids being sealed.

21. A plural fluid magnetic/centrifugal-fluid seal according to claim 20 wherein the magnetic field producing means comprises a permanent magnet capable of producing a sufficiently strong magnetic field to drive the magnetic permeable fluid into a saturation magnetization condition.

22. A plural fluid magnetic/centrifugal-fluid seal according to claim 20 wherein said magnetic field producing means comprises an electromagnet capable of producing a sufficiently strong magnetic field to drive the magnetically permeable fluid into a saturation magnetization condition and electrically controlled by on/off switch means for turning the electromagnet on while the rotatable member is at rest and during slow speed operation thereof and for turning the electromagnet off during high speed rotation of the rotatable member.

23. A plural fluid magnetic/centrifugal-fluid seal according to claim 21 further including means for cooling the circumferentially arranged centrifugal seal forming region of said seal during high speed rotation of said rotatable member.

24. A plural fluid magnetic/centrifugal-fluid seal according to claim 22 further including means for cooling the circumferentially arranged centrifugal seal forming region of said seal during high speed rotation of said rotatable member.

25. A plural fluid magnetic/centrifugal seal according to claim 17 wherein the low viscosity centrifugal sealing fluid comprises the lubricating oil of an apparatus of machine on which the seal is used with the means for receiving and pooling the low viscosity centrifugal sealing fluid being included in and comprising a part of the lubricating oil cooling and supply system for the machine and wherein said centrifugal seal serves as an auxiliary lubricating oil pump used in conjunction with the main lubricating oil circulating pump for pumping the lubricating oil from said centrifugal seal region to a lubricating oil reservoir comprising a part of the lubricating oil supply system.

26. A plural fluid magnetic/centrifugal seal according to claim 25 further including a pressurized labyrinth buffer seal positioned on the rotating member adjacent the plural fluid magnetic/centrifugal seal intermediate the plural fluid magnetic/centrifugal seal and a hostile high pressure atmosphere and coacting with the plural fluid magnetic/centrifugal seal to form a combined two-stage labyrinth and magnetic/centrifugal seal against the high pressure hostile atmosphere.

27. A plural fluid magnetic/centrifugal-fluid seal according to claim 26 wherein the magnetic field producing means comprises a permanent magnet capable of producing a sufficiently strong magnetic field to drive the magnetic permeable fluid into a saturation magnetization condition.

28. A plural fluid magnetic/centrifugal-fluid seal according to claim 26 wherein said magnetic field producing means comprises an electromagnet capable of producing a sufficiently strong magnetic field to drive the magnetically permeable fluid into a saturation magnetization condition and electrically controlled by on/off switch means for turning the electromagnet on while the rotatable member is at rest and during slow speed operation thereof and for turning the electromagnet off during high speed rotation of the rotatable member.

29. A plural fluid magnetic/centrifugal-fluid seal according to claim 1 further including means for trapping and containing the magnetically permeable fluid during high speed rotation of the rotating member to thereby prevent substantial intermixture of the two different viscosity fluids.

30. A plural fluid magnetic/centrifugal-seal according to claim 29 wherein the means for trapping and and containing the magnetically permeable fluid during high speed rotation comprises a reservoir for said magnetically permeable fluid formed in a space intermediate the rotating and stationary members for collecting and pooling said magnetically permeable fluid during high speed rotation of said rotating member to thereby essentially isolate the two different viscosity fluids one from the other in separate but communicating spaces.

* * * * *